United States Patent
Wu

(10) Patent No.: US 12,108,480 B2
(45) Date of Patent: Oct. 1, 2024

(54) METHOD FOR DATA TRANSMISSION, METHOD FOR INFORMATION CONFIGURATION, TERMINAL, AND NETWORK DEVICE

(71) Applicant: VIVO MOBILE COMMUNICATION CO., LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 381 days.

(21) Appl. No.: 17/487,229

(22) Filed: Sep. 28, 2021

(65) Prior Publication Data

US 2022/0015184 A1    Jan. 13, 2022

Related U.S. Application Data

(63) Continuation of application No. PCT/CN2020/079883, filed on Mar. 18, 2020.

(30) Foreign Application Priority Data

Mar. 28, 2019    (CN) .......................... 201910245137.6

(51) Int. Cl.
  *H04W 76/27*    (2018.01)
  *H04W 76/14*    (2018.01)

(52) U.S. Cl.
  CPC ........... *H04W 76/27* (2018.02); *H04W 76/14* (2018.02)

(58) Field of Classification Search
  None
  See application file for complete search history.

(56) References Cited

U.S. PATENT DOCUMENTS

| | | | |
|---|---|---|---|
| 11,063,704 B2 * | 7/2021 | Zou | H04W 36/0069 |
| 11,218,256 B2 * | 1/2022 | Tang | H04W 76/27 |
| 11,272,568 B2 * | 3/2022 | Shi | H04L 1/08 |
| 11,831,448 B2 * | 11/2023 | Xu | H04W 76/15 |
| 2018/0310202 A1 * | 10/2018 | Löhr | H04W 76/27 |
| 2018/0324642 A1 * | 11/2018 | Yu | H04L 5/0053 |
| 2018/0367463 A1 | 12/2018 | Jose et al. | |
| 2019/0053325 A1 * | 2/2019 | Yu | H04W 76/15 |

(Continued)

FOREIGN PATENT DOCUMENTS

| CN | 108809476 A | 11/2018 |
|---|---|---|
| CN | 109150748 A | 1/2019 |

(Continued)

OTHER PUBLICATIONS

OPPO, "Solutions and TPs of duplication control using MAC CE", 3GPP TSG-RAN2 #101 bis, R2-1804432, Sanya, China, Apr. 15-Apr. 20, 2018.

(Continued)

*Primary Examiner* — Otis L Thompson, Jr.
(74) *Attorney, Agent, or Firm* — Price Heneveld LLP

(57) ABSTRACT

This disclosure provides a method for data transmission, a method for information configuration, a terminal, and a network device. The method for data transmission includes: determining at least one transmission path usable for a radio bearer in a case that a PDCP duplication function of the radio bearer changes from an activated state to a deactivated state; and transmitting PDCP data by using the at least one transmission path.

16 Claims, 5 Drawing Sheets

Determine at least one transmission path usable for a radio bearer in a case that a PDCP duplication function of the radio bearer changes from an activated state to a deactivated state — 501

Transmit PDCP data by using the at least one transmission path — 502

(56) References Cited

U.S. PATENT DOCUMENTS

| | | | |
|---|---|---|---|
| 2019/0239279 A1* | 8/2019 | Shi | H04W 76/15 |
| 2019/0342224 A1 | 11/2019 | Tang | |
| 2019/0349139 A1* | 11/2019 | Park | H04W 76/27 |
| 2020/0029379 A1* | 1/2020 | Xiao | H04L 1/22 |
| 2020/0053632 A1* | 2/2020 | Löhr | H04W 76/15 |
| 2020/0119864 A1* | 4/2020 | Xu | H04L 1/08 |
| 2020/0120569 A1 | 4/2020 | Baek et al. | |
| 2020/0178327 A1* | 6/2020 | Jiang | H04W 76/19 |
| 2020/0187297 A1* | 6/2020 | Jiang | H04L 1/0006 |
| 2020/0213219 A1 | 7/2020 | Tang | |
| 2020/0236033 A1 | 7/2020 | Wu et al. | |
| 2020/0267793 A1* | 8/2020 | Sharma | H04W 28/02 |
| 2020/0322864 A1* | 10/2020 | Wu | H04L 41/0668 |
| 2021/0168650 A1* | 6/2021 | Mok | H04W 28/06 |
| 2023/0389104 A1* | 11/2023 | Park | H04L 5/0055 |

FOREIGN PATENT DOCUMENTS

| | | |
|---|---|---|
| CN | 109391639 A | 2/2019 |
| EP | 1087573 A1 | 3/2001 |
| KR | 20110070295 A | 6/2011 |
| WO | 2018230920 A1 | 12/2018 |
| WO | 2019019182 A1 | 1/2019 |
| WO | 2019024535 A1 | 2/2019 |

OTHER PUBLICATIONS

Nokia, "Remaining MAC issues on duplication", 3GPP TSG-RAN WG2 NR Ad hoc 1801, R2-1800590, Vancouver, Canada, Jan. 22-26, 2018.

OPPO, "Discussion on data duplication for IIoT", 3GPP TSG-RAN WG2 #104, R2-1817251, Spokane, United States, Nov. 12-16, 2018.

Vivo, "PDCP duplication impacts on LCP", 3GPP TSG-RAN WG2 Meeting #99, R2-1708502, Berlin, Germany, Aug. 21-25, 2017.

ZTE, CMCC, Consideration on the bearer type harmonization, 3GPP TSG RAN WG2#NR_AdHoc#2, R2-1706980, Jun. 27-29, 2017, Qingdao, China.

Huawei et al: "Link selection upon duplication deactivation", 3GPP TSG-RAN2 #99, Berlin, Germany, Aug. 21-25, 2017, R2-1707714. Retrieved from the Internet: URL:http://www.3gpp.org/ftp/Meetings_3GPP_SYNC/RAN2/Docs/, 3 pages.

ZTE: "Impact of PDCP Duplication on RLC Layer", 3GPP TSG-RAN WG2 NR Ad Hoc 1801, Vancouver, Canada, Jan. 22-26, 2018, R2-1800394. Retrieved from the Internet: URL:http://www.3gpp.org/ftp/tsg%5Fran/WG2%5FRL2/TSGR2%5FAHs/2018%5F01%5FNR/Docs/, 2 pages.

"3rd Generation Partnership Project; Technical Specification Group Radio Access Network; NR; Radio Resource Control (RRC) protocol specification (Release 15)", 3GPP TS 38.331 V15.54.0, Mar. 2019, Valbonne, France.

Huawei, "UE behaviors upon deactivation of DC duplication", 3GPP TSG RAN WG2 #99, R2-1707717, Berlin, Germany, Aug. 21-25, 2017.

* cited by examiner

METHOD FOR DATA TRANSMISSION, METHOD FOR INFORMATION CONFIGURATION, TERMINAL, AND NETWORK DEVICE

CROSS-REFERENCE TO RELATED APPLICATIONS

This application is a continuation application of International Application No. PCT/CN2020/079883 filed on Mar. 18, 2020, which claims priority to Chinese Patent Application No. 201910245137.6, filed in China on Mar. 28, 2019, which are incorporated herein by reference in their entireties.

TECHNICAL FIELD

This disclosure relates to the field of communications technologies, and in particular, to a method for data transmission, a method for information configuration, a terminal, and a network device.

BACKGROUND

In the related art, in order to improve reliability of data transmission, a multiple leg data duplication function, for example, a packet data convergence protocol (PDCP) duplication function, may be configured for a radio bearer (RB) of a terminal. The PDCP duplication function may be in an activated state or a deactivated state.

However, in a case that a PDCP duplication function of a radio bearer is deactivated, it is still unclear how to transmit data of the radio bearer.

SUMMARY

Embodiments of this disclosure provide a method for data transmission, a method for information configuration, a terminal, and a network device, so as to resolve the problem that in a case that a PDCP duplication function of a radio bearer is deactivated, it is still unclear how to transmit data of the radio bearer.

In order to resolve the foregoing technical problem, the embodiments of this disclosure are implemented as follows:

According to a first aspect, some embodiments of this disclosure provide a method for data transmission, applied to a terminal and including:

determining at least one transmission path usable for a radio bearer in a case that a PDCP duplication function of the radio bearer changes from an activated state to a deactivated state; and transmitting PDCP data by using the at least one transmission path.

According to a second aspect, some embodiments of this disclosure provide a method for information configuration, applied to a network device and including:

transmitting first configuration information to a terminal; where the first configuration information is configuration information with a PDCP duplication function of a radio bearer deactivated.

According to a third aspect, some embodiments of this disclosure provide a terminal, including:

a first determining module, configured to determine at least one transmission path usable for a radio bearer in a case that a packet data convergence protocol PDCP duplication function of the radio bearer changes from an activated state to a deactivated state; and a first transmitting module, configured to transmit PDCP data by using the at least one transmission path.

According to a fourth aspect, some embodiments of this disclosure provide a network device, including:

a second transmitting module, configured to transmit first configuration information to a terminal, where the first configuration information is configuration information with a PDCP duplication function of a radio bearer deactivated.

According to a fifth aspect, some embodiments of this disclosure provide a terminal, including a memory, a processor, and a program stored in the memory and capable of running on the processor. When the program is executed by the processor, the steps of the method for data transmission applied to the terminal can be implemented, or the steps of the method for information configuration applied to the network device can be implemented.

According to a sixth aspect, some embodiments of this disclosure provide a computer-readable storage medium, where a computer program is stored in the computer-readable storage medium. When the computer program is executed by a processor, the steps of the method for data transmission applied to the terminal can be implemented, or the steps of the method for information configuration applied to the network device can be implemented.

In some embodiments of this disclosure, in a case that the PDCP duplication function is configured for a radio bearer of the terminal, and the PDCP duplication function changes from the activated state to deactivated state, at least one transmission path usable for the radio bearer can be determined, and PDCP data is transmitted by using the at least one transmission path. In this way, it is clear about how to transmit data of a radio bearer when a PDCP duplication function of the radio bearer is deactivated.

BRIEF DESCRIPTION OF DRAWINGS

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings.

DESCRIPTION OF EMBODIMENTS

Figure 1:
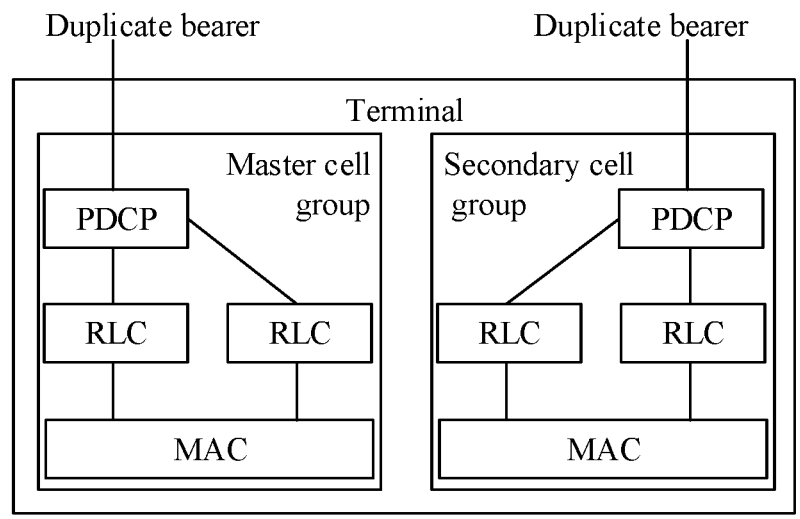
FIG. 1 is a schematic diagram of a bearer type of a PDCP duplication function.

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings.

First, some concepts included in the embodiments of this disclosure are described.

1. Transmission Based on Packet Data Convergence Protocol (PDCP) Duplication (PDCP Duplication)

In new radio (NR), in order to improve reliability of data transmission, the PDCP duplication feature is introduced. A network side configures whether a PDCP layer corresponding to a radio bearer (RB) of a terminal such as user equipment (UE) duplicates data of a PDCP entity and transmits duplicated data through two (or more) transmission paths (for example, two different radio link control (RLC) entities), where different RLC entities correspond to different logical channels.

Medium access control layer control signaling (MAC CE) may be used to indicate whether to enable (activate) or disable (deactivate) the PDCP duplication function. When configuring the PDCP duplication function of the RB, the network side may configure the function to be enabled immediately upon configuration without being additionally activated by using MAC CE signalling.

In a plurality of transmission paths (which may be referred to as paths), one path is a primary path (primary leg), and the primary path is always in an activated state (that is, the primary path can be always used for data transmission, and does not need to be activated or deactivated by using MAC CE). A PDCP control PDU (Protocol Data Unit) of the UE is not duplicated and can be transmitted only through the primary path. PDCP data PDUs of the UE are duplicated when duplication is activated, and duplicated data packets can be transmitted only through different paths.

2. Bearer Type of the PDCP Duplication Function

In a 5G system, a dual connectivity (DC) architecture (including two cell groups, namely a master cell group (MCG) and a secondary cell group (SCG)) is used. The MCG corresponds to a master node (MN) on the network side, and the SCG corresponds to a secondary node (SN) of the network side. Therefore, the PDCP duplication function is specific to two bearer types shown in FIG. 1 and FIG. 2:

A11, split bearer: A PDCP entity corresponding to the bearer is in one cell group, and two (or more) RLC entities and two (or more) MAC entities corresponding to the bearer are in different groups.

A12, duplicate bearer: One PDCP entity, two (or more) RLC entities, and one MAC entity corresponding to the bearer are in one cell group.

When the PDCP duplication function is used for a split bearer, if the PDCP duplication function is deactivated, the split bearer may fall back to a DC split bearer working mode. In the DC split bearer working mode, the UE obtains a data split threshold (DataSplitThreshold) configured on the network side. If the amount of PDCP data and/or "the amount of data buffered by the RLC layer for initial transmission" is greater than or equal to the threshold, the UE determines that the data of the PDCP layer is to be transmitted through the primary RLC entity (or primary transmission path, also referred to as the primary path) and the secondary RLC entity (or secondary transmission path, also referred to as the secondary path). If the amount of PDCP data and/or "the amount of data buffered by the RLC layer for initial transmission" is less than the threshold, the UE determines that the data of the PDCP layer is to be transmitted through the primary RLC entity.

3. Multiple Leg PDCP Duplication

Figure 3:
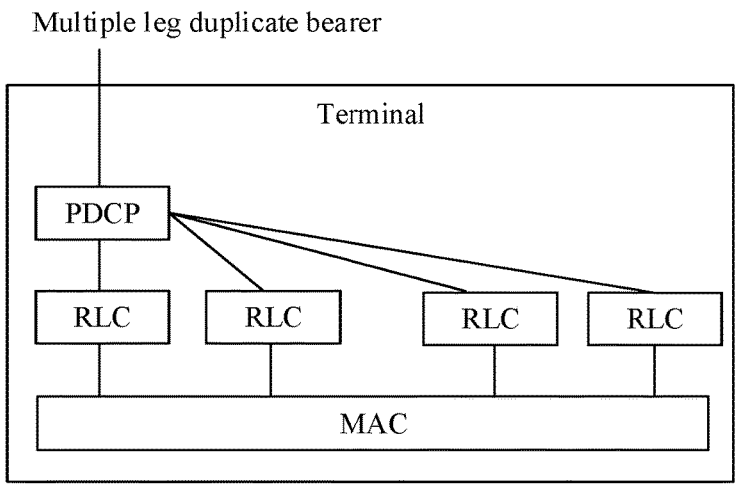
FIG. 3 is a schematic diagram of a bearer type of a multiple leg PDCP duplication function.
Figure 4:
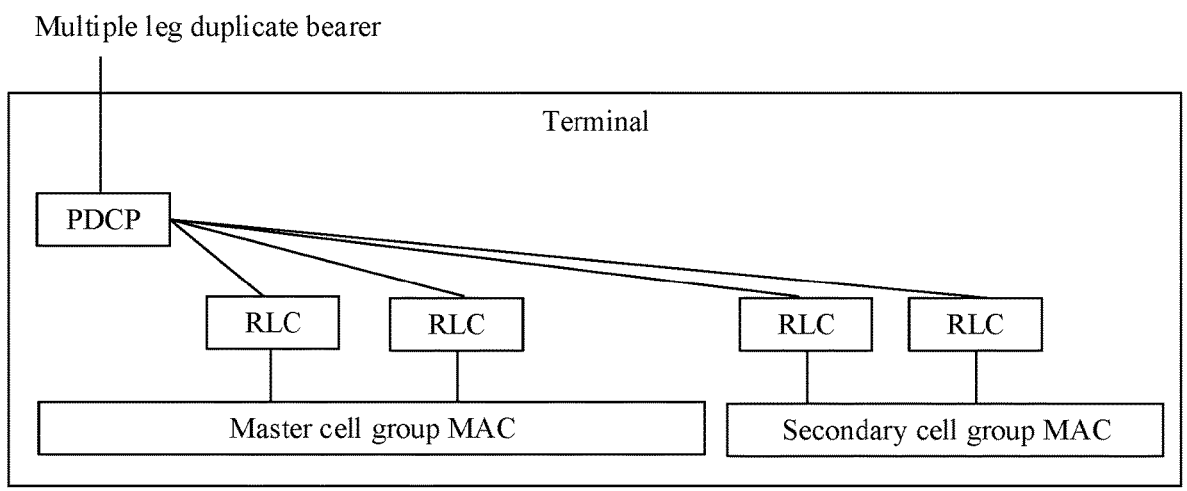
FIG. 4 is another schematic diagram of a bearer type of a multiple leg PDCP duplication function.

As shown in FIG. 3 and FIG. 4, the PDCP duplication function can be configured with more than two (for example, 3) paths (for example, one PDCP entity corresponds to more than three RLC entities), and the network side may choose to deactivate one or more paths (for example, deactivating one path while leaving two paths working). The deactivated path is not used for data reception or transmission, and the PDCP duplication function continues to be usable on the activated path. For a deactivated path, the terminal cannot transmit data through a corresponding logical channel; for an activated path, the terminal can transmit data through a corresponding logical channel. The configured plurality of paths may belong to one MAC entity or two MAC entities.

In some embodiments of this disclosure, if a plurality of transmission paths are configured for a radio bearer of a terminal, depending on whether the plurality of transmission paths configured for the radio bearer belong to one MAC entity or more MAC entities, two scenarios are distinguished:

Scenario 1: The plurality of transmission paths configured for the radio bearer belong to one MAC entity.

Scenario 2: The plurality of transmission paths configured for the radio bearer belong to a plurality of MAC entities.

In some embodiments of this disclosure, according to the network device configuration (which is network side configuration) or the protocol, working modes with the PDCP duplication function deactivated include: DC working mode and non-DC working mode. It can be understood that the foregoing scenario 1 is applicable to the non-DC working mode and the foregoing scenario 2 is applicable to both non-DC working mode and DC working mode.

This disclosure is described in detail below with reference to the embodiments and the accompanying drawings.

Figure 2:
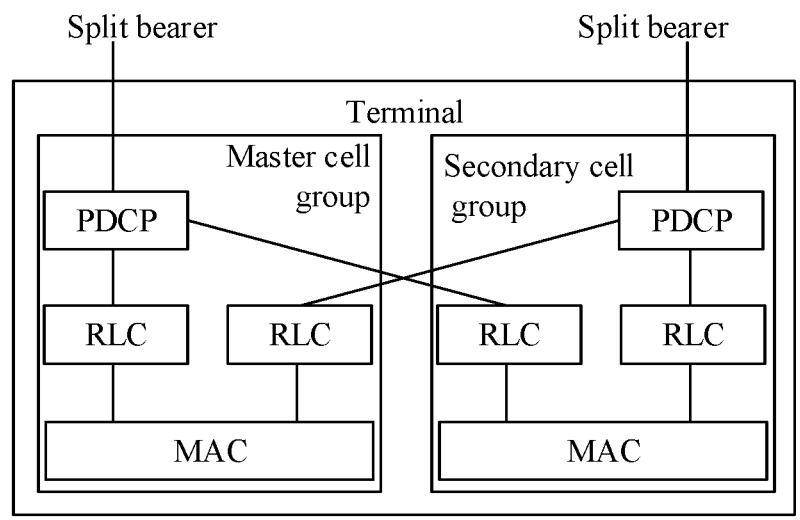
FIG. 2 is another schematic diagram of a bearer type of a PDCP duplication function.

Referring to FIG. 1, FIG. 1 is a flowchart of a method for data transmission according to some embodiments of this disclosure. The method is applied to a terminal. As shown in FIG. 1, the method includes the following steps.

Step 501: Determine at least one transmission path usable for a radio bearer in a case that a PDCP duplication function of the radio bearer changes from an activated state to a deactivated state.

In this embodiment, the radio bearer is optionally a radio bearer that is determined. The radio bearer is optionally a signaling radio bearer (SRB), or a data radio bearer (DRB). The radio bearer may be configured with more than two transmission paths (such as four transmission paths, corresponding to logical channels 1, 2, 3, and 4, respectively). The network device (namely, the network side) may configure the PDCP duplication function for the radio bearer.

It can be understood that the plurality of transmission paths of the radio bearer may belong to one MAC entity (corresponding to the foregoing scenario 1); or may belong to a plurality of MAC entities (corresponding to the foregoing scenario 2). For example, when there are four transmission paths, transmission paths 1 and 2 belong to an MCG MAC entity, and transmission paths 3 and 4 belong to an SCG MAC entity.

Step 502: Transmit PDCP data by using the at least one transmission path.

In this embodiment, the transmitting PDCP data may be construed as transmitting the data by the PDCP entity of the terminal through the at least one transmission path.

For example, the foregoing scenario 1, a PDCP duplication function of a DRB1 changes from an activated state to a deactivated state, and a transmission path 1 (corresponding to a logical channel identifier 1) is usable. In this case, the PDCP entity of the UE transmits data through the transmission path 1, and the PDCP entity of the UE obtains through statistics collection and reports data volume information of the PDCP to the network device through the transmission path 1.

Alternatively, in the foregoing scenario 1, the PDCP duplication function of the DRB1 changes from the activated state to the deactivated state, and the transmission path 1 (corresponding to the logical channel identifier 1) and a transmission path 2 (corresponding to a logical channel identifier 2) are usable. In this case, the PDCP entity of the UE transmits the data through the transmission path 1 and the transmission path 2. The PDCP entity of the UE obtains through statistics collection and reports, to the network device through the transmission path 1, data volume information of the PDCP data that is to be transmitted through the transmission path 1. The PDCP entity of the UE obtains through statistics collection and reports, to the network device through the transmission path 2, data volume information of the PDCP data that is to be transmitted through the transmission path 2.

For another example, the foregoing scenario 2, a PDCP duplication function of a DRB2 changes from an activated state to a deactivated state, and a transmission path 1 (corresponding to an MCG logical channel identifier 1) is usable, the PDCP entity of the UE transmits data through the transmission path 1, and the PDCP entity of the UE obtains through statistics collection and reports data volume information of the PDCP to the network device through the transmission path 1.

Alternatively, in the foregoing scenario 2, the PDCP duplication function of the DRB2 changes from the activated state to the deactivated state, and the transmission path 1 (corresponding to the MCG logical channel identifier 1) and a transmission path 3 (corresponding to an SCG logical channel identifier 3) are usable. In this case, the PDCP entity of the UE transmits the data through the transmission path 1 and the transmission path 3. The PDCP entity of the UE obtains through statistics collection and reports, to the network device through the transmission path 1, data volume information of the PDCP data that is to be transmitted through the transmission path 1. The PDCP entity of the UE obtains through statistics collection and reports, to the network device through the transmission path 3, data volume information of the PDCP data that is to be transmitted through the transmission path 3.

According to the method for data transmission in some embodiments of this disclosure, in a case that the PDCP duplication function is configured for a radio bearer of the terminal, and the PDCP duplication function changes from the activated state to deactivated state, at least one transmission path usable for the radio bearer can be determined, and PDCP data is transmitted by using the at least one transmission path. In this way, it is clear about how to transmit data of a radio bearer when a PDCP duplication function of the radio bearer is deactivated, thereby ensuring that the network device side and the terminal side have the same understanding on a data reception and transmission mode of a corresponding radio bearer, and implementing more reliable data transmission.

In some embodiments of this disclosure, optionally, step 501 may include:

determining the at least one transmission path usable for the radio bearer based on at least one of the following:

first configuration information; or deactivation signaling received from a network device; where the first configuration information is configuration information with the PDCP duplication function of the radio bearer deactivated, and the deactivation signaling is used to indicate changing the PDCP duplication function of the radio bearer from the activated state to the deactivated state.

It can be understood that the first configuration information may be prescribed by the protocol or configured by the network device. For subsequent activation (turning from the deactivated state to the activated state) of the PDCP duplication function of the radio bearer, the PDCP duplication function may be activated by the network device by using a MAC CE (control element), that is, the network device transmits activation signalling to the terminal by using the MAC CE; or, for subsequent deactivation (turning from the activated state to the deactivated state) of the PDCP duplication function of the radio bearer, the PDCP duplication function may be deactivated by the network device by using a MAC CE, that is, the network device transmits deactivation signalling to the terminal by using the MAC CE.

In this way, the usable transmission path is determined based on the first configuration information and/or deactivation signaling, so that the network device side and the terminal side have the same understanding on a data reception and transmission mode of a corresponding radio bearer, and implementing more reliable data transmission.

Optionally, the first configuration information may include at least one of the following:

(1) Identification information of at least one usable transmission path, that is, identification information of one or more transmission paths usable after a PDCP duplication function of a corresponding radio bearer is deactivated. This configuration (1) is applicable to the foregoing scenario 1 and the foregoing scenario 2.

For example, in the foregoing scenario 1, in a case that the PDCP duplication function is deactivated, the usable transmission path for transmitting PDCP data by the UE may be configured to be a transmission path 1 (corresponding to a logical channel identifier 1), or a transmission path 1 (corresponding to a logical channel identifier 1) and a transmission path 2 (corresponding to a logical channel identifier 2).

For another example, in the foregoing scenario 2, in a case that the PDCP duplication function is deactivated, the usable transmission path for transmitting PDCP data by the UE may be configured to be a transmission path 1 (corresponding to an MCG logical channel identifier 1), or a transmission path 1 (corresponding to an MCG logical channel identifier 1) and a transmission path 3 (corresponding to an SCG logical channel identifier 3).

(2) Using a DC working mode for the radio bearer after deactivation of the PDCP duplication function, meaning that the network device configures or the protocol stipulates that the DC working mode is to be used for the radio bearer after deactivation of the PDCP duplication function. This configuration (2) is applicable to the foregoing scenario 2.

Based on this configuration (2), the terminal may determine to use the DC working mode for a corresponding radio bearer after deactivation of the PDCP duplication function.

Further, on the premise that the first configuration information includes using a DC working mode for the radio bearer after deactivation of the PDCP duplication function, the first configuration information may further include: configuration information of the DC working mode.

The configuration information of the DC working mode includes any one of the following:

(1) Identification Information of Two Transmission Paths Used for the DC Working Mode For example, the protocol stipulates that when a PDCP duplication function of an RB is deactivated, the UE uses the DC working mode, and in such DC working mode, the transmission path used for transmitting PDCP data is: a transmission path 1 (corresponding to an MCG logical channel identifier 1) and a transmission path 3 (corresponding to an SCG logical channel identifier 3). The transmission path 1 may be configured as a primary transmission path, and the transmission path 3 may be configured as a secondary transmission path; or, the transmission path 1 may be configured as a secondary transmission path, and the transmission path 3 may be configured as a primary transmission path.

(2) Identification Information of a Primary Transmission Path Used for the DC Working Mode For example, the network device configures the primary transmission path for the DC working mode by using the RRC message to be the transmission path 1 (corresponding to the MCG logical channel identifier 1). When a PDCP duplication function of an RB is deactivated by a MAC CE, the MAC CE indicates one active transmission path (corresponding to an SCG logical channel 3). In this case, the UE may set the primary transmission path of the RB to be the transmission path 1, and set the secondary transmission path to be the transmission path 3.

(3) Identification Information of a Secondary Transmission Path Used for the DC Working Mode For example, the network device configures the secondary transmission path for the DC working mode by using the RRC message to be the transmission path 1 (corresponding to the MCG logical channel identifier 1). When a PDCP duplication function of an RB is deactivated by a MAC CE, the MAC CE indicates one active transmission path (corresponding to an SCG logical channel 3). In this case, the UE may set the secondary transmission path of the RB to be the transmission path 1, and set the primary transmission path to be the transmission path 3.

In some embodiments of this disclosure, optionally, the deactivation signaling used for deactivating the PDCP duplication function may indicate any one of the following:

(1) That all transmission paths of the radio bearer are to be in the deactivated state, meaning that all transmission paths of a radio bearer correspondingly configured with the PDCP duplication function are to be in the deactivated state. This indicator (1) is applicable to the foregoing scenario 1 and the foregoing scenario 2.

For example, if transmission paths 1, 2, 3, and 4 (corresponding to logical channels 1, 2, 3, and 4, respectively) are configured for DRB1, the deactivation signaling indicates that all the transmission paths 1, 2, 3, and 4 are to be in the deactivated state.

(2) A first transmission path of the radio bearer is to be in the activated state while other transmission paths are to be in the deactivated state, where the other transmission paths are transmission paths other than the first transmission path in all the transmission paths of the radio bearer. This indicator (2) is applicable to the foregoing scenario 1 and the foregoing scenario 2.

The first transmission path is specifically one transmission path, that is, only one transmission path of a radio bearer correspondingly configured with the PDCP duplication function is to be in the activated state.

For example, if transmission paths 1, 2, 3, and 4 (corresponding to logical channels 1, 2, 3, and 4, respectively) are configured for DRB1, the deactivation signaling indicates that only the transmission path 1 is to be in the activated state and other transmission paths (transmission paths 2, 3, and 4) are to be in the deactivated state.

(3) Two transmission paths, where the two transmission paths are transmission paths of the radio bearer in the DC working mode after deactivation of the PDCP duplication function. This indicator (3) is applicable to the foregoing scenario 2.

For example, if transmission paths 1, 2, 3, and 4 (corresponding to logical channels 1, 2, 3, and 4, respectively) are configured for DRB1, the deactivation signaling indicates that two transmission paths for the DC working mode after the PDCP duplication function of DRB1 is deactivated are the transmission path 1 (corresponding to the MCG logical channel identifier 1) and the transmission path 3 (corresponding to the SCG logical channel identifier 3).

Optionally, the process in which the terminal determines at least one transmission path usable for the radio bearer based on the first configuration information and/or deactivation signaling may include any one of the following:

(1) in a case that the deactivation signaling indicates that all the transmission paths of the radio bearer are to be in the deactivated state, the terminal determines the at least one transmission path based on the identification information of the at least one usable transmission path included in the first configuration information;

(2) in a case that the deactivation signaling indicates that the first transmission path of the radio bearer is to be in the activated state and other transmission paths are to be in the deactivated state, the terminal determines the first transmission path as the transmission path of the radio bearer;

(3) in a case that the first configuration information includes the identification information of two transmission paths used for the DC working mode, the terminal determines the two transmission paths as the transmission paths of the radio bearer in the DC working mode;

(4) in a case that the first configuration information includes the identification information of the primary transmission path for the DC working mode, the terminal determines the primary transmission path as a primary transmission path of the radio bearer in the DC working mode, and determines a transmission path to be in the activated state as indicated by the deactivation signalling as a secondary transmission path of the radio bearer in the DC working mode;

(5) in a case that the first configuration information includes the identification information of the secondary transmission path for the DC working mode, the terminal determines the secondary transmission path as a secondary transmission path of the radio bearer in the DC working mode, and determines a transmission path to be in the activated state as indicated by the deactivation signalling as a primary transmission path of the radio bearer in the DC working mode;

(6) determining the two transmission paths (corresponding to the indicator 3) indicated by the deactivation signaling as the transmission paths of the radio bearer in the DC working mode, where the two transmission paths are transmission paths of the radio bearer in the DC working mode after deactivation of the PDCP duplication function.

Further, after the two transmission paths indicated by the deactivation signalling are determined as the transmission paths for the DC working mode of the radio bearer, the method further includes:

determining a transmission path of an MCG in the two transmission paths as a primary transmission path, and determining a transmission path of an SCG in the two transmission paths as a secondary transmission path; or determining a transmission path of an SCG in the two transmission paths as a primary transmission path, and determining a transmission path of an MCG in the two transmission paths as a secondary transmission path.

It should be noted that the foregoing method for determining the primary transmission path and the secondary transmission path may be prescribed by the protocol or configured by the network device. For example, the corresponding configuration information is included in the first configuration information and is configured by using the RRC message; or may be indicated by the network device, for example, indicated by the MAC CE of deactivation signalling.

Optionally, before step 501, the method further includes: obtaining second configuration information; and determining an initial state of the PDCP duplication function of the radio bearer based on the second configuration information; where the second configuration information includes an initial state of the PDCP duplication function of the radio bearer, and the initial state is any one of the activated state or the deactivated state. The second configuration information may be prescribed by the protocol or configured by the network device. When the second configuration information is configured by the network device, the network device may transmit the second configuration information to the terminal by using an RRC message.

For example, when the initial state is an activated state, the UE immediately activates the PDCP duplication function of the corresponding RB after receiving the corresponding RRC message (the configuration information included therein indicates that the initial state of the PDCP duplication function is an activated state).

For another example, when the initial state is a deactivated state, the UE does not activate the PDCP duplication function of the corresponding RB after receiving the corresponding RRC message (the configuration information included therein indicates that the initial state of the PDCP duplication function is a deactivated state).

Further, the second configuration information further includes: configuration information with the initial state being an activated state (as prescribed by the protocol or configured by the network device), or configuration information with the initial state being a deactivated state (as prescribed by the protocol or configured by the network device).

The configuration information with the initial state being the activated state includes: identification information of a plurality of activated transmission paths.

For example, in the foregoing scenario 1, the identification information of the plurality of activated transmission paths may include: a logical channel identifier 1 corresponding to an activated transmission path 1 and a logical channel identifier 2 corresponding to an activated transmission path 2. For example, in the foregoing scenario 2, the identification information of the plurality of activated transmission paths is optionally: an MCG logical channel identifier 1 corresponding to an activated transmission path 1 and an SCG logical channel identifier 3 corresponding to an activated transmission path 3.

The configuration information with the initial state being the deactivated state includes: identification information of at least one usable transmission path.

For example, in the foregoing scenario 1, in a case that the initial state of the PDCP duplication function is a deactivated state, a transmission path for transmitting PDCP data by the UE may be configured to be a transmission path 1 (corresponding to a logical channel identifier 1), or a transmission path 1 (corresponding to a logical channel identifier 1) and a transmission path 2 (corresponding to a logical channel identifier 2).

For example, in the foregoing scenario 2, in a case that the initial state of the PDCP duplication function is a deactivated state, a transmission path for transmitting PDCP data by the UE may be configured to be a transmission path 1 (corresponding to an MCG logical channel identifier 1), or a transmission path 1 (corresponding to an MCG logical channel identifier 1) and a transmission path 3 (corresponding to an MCG logical channel identifier 3).

Further, after the second configuration information is obtained, the method may further include:

determining, based on the second configuration information, a transmission path for transmitting the PDCP data.

In this way, based on the determined transmission path, the terminal may transmit corresponding data.

For example, in the foregoing scenario 1, an initial state of DRB1 is the PDCP duplication function being activated, and the activated transmission path 1 (corresponding to the logical channel identifier 1) and the activated transmission path 2 (corresponding to the logical channel identifier 2) are configured. In this case, the PDCP entity of the UE transmits the data and duplicated data through the transmission path 1 and the transmission path 2, and the PDCP entity of the UE obtains through statistics collection and reports data volume information of the PDCP through the transmission path 1 and the transmission path 2 to the network device.

Alternatively, in the foregoing scenario 1, an initial state of DRB1 is the PDCP duplication function being deactivated, and a usable transmission path 1 (corresponding to the logical channel identifier 1) is configured. In this case, the PDCP entity of the UE transmits data through the transmission path 1, and the PDCP entity of the UE obtains through statistics collection and reports data volume information of the PDCP through the transmission path 1 to the network device.

Alternatively, in the foregoing scenario 1, an initial state of DRB1 is the PDCP duplication function being deactivated, and a usable transmission path 1 (corresponding to a logical channel identifier 1) and a usable transmission path 2 (corresponding to a logical channel identifier 2) are configured. In this case, the PDCP entity of the UE transmits data through the transmission path 1 and the transmission path 2; the PDCP entity of the UE obtains through statistics collection and reports, to the network device through the transmission path 1, data volume information of the PDCP data that is to be transmitted through the transmission path 1; and the PDCP entity of the UE obtains through statistics collection and reports, to the network device through the transmission path 2, data volume information of the PDCP data that is to be transmitted through the transmission path 2.

For another example, in the foregoing scenario 2, an initial state of DRB2 is the PDCP duplication function being activated, and the activated transmission path 1 (corresponding to the MCG logical channel identifier 1) and the activated transmission path 3 (corresponding to the SCG logical channel identifier 3) are configured. In this case, the PDCP entity of the UE transmits the data and duplicated data through the transmission path 1 and the transmission path 3, and the PDCP entity of the UE obtains through statistics collection and reports data volume information of the PDCP through the transmission path 1 and the transmission path 3 to the network device.

Alternatively, in the foregoing scenario 2, an initial state of DRB2 is the PDCP duplication function being deactivated, and a usable transmission path 1 (corresponding to the MCG logical channel identifier 1) is configured. In this case, the PDCP entity of the UE transmits data through the transmission path 1, and the PDCP entity of the UE obtains through statistics collection and reports data volume information of the PDCP through the transmission path 1 to the network device.

Alternatively, in the foregoing scenario 2, an initial state of DRB2 is the PDCP duplication function being deactivated, and a usable transmission path 1 (corresponding to an MCG logical channel identifier 1) and a usable transmission path 3 (corresponding to an SCG logical channel identifier 3) are configured. In this case, the PDCP entity of the UE transmits data through the transmission path 1 and the transmission path 3; the PDCP entity of the UE obtains through statistics collection and reports, to the network device through the transmission path 1, data volume information of the PDCP data that is to be transmitted through the transmission path 1; and the PDCP entity of the UE obtains through statistics collection and reports, to the network device through the transmission path 3, data volume information of the PDCP data that is to be transmitted through the transmission path 3.

Figure 6:
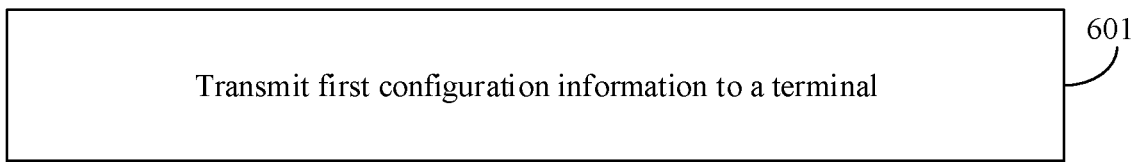
FIG. 6 is a flowchart of a method for information configuration according to some embodiments of the disclosure.

Referring to FIG. 6, FIG. 6 is a flowchart of a method for information configuration according to some embodiments of this disclosure. The method is applied to a network device, and as shown in FIG. 6, the method includes the following steps.

Step 601: Transmit first configuration information to a terminal.

The first configuration information is configuration information with a PDCP duplication function of a radio bearer deactivated.

In some embodiments of this disclosure, with the received first configuration information, the terminal may be clear about how to transmit data of a radio bearer when a PDCP duplication function of the radio bearer is deactivated, thereby ensuring that the network device side and the terminal side have the same understanding on a data reception and transmission mode of a corresponding radio bearer, and implementing more reliable data transmission.

Optionally, the first configuration information includes at least one of the following:

identification information of at least one usable transmission path; or using a DC working mode for the radio bearer after deactivation of the PDCP duplication function.

Optionally, in a case that the first configuration information includes using a DC working mode for the radio bearer after deactivation of the PDCP duplication function, the first configuration information further includes: configuration information of the DC working mode.

The configuration information of the DC working mode includes any one of the following:

identification information of two transmission paths used for the DC working mode;

identification information of a primary transmission path used for the DC working mode; or identification information of a secondary transmission path used for the DC working mode.

Optionally, after step 601, the method further includes:

transmitting deactivation signaling to the terminal.

The deactivation signaling is used to indicate that the packet data convergence protocol PDCP duplication function of the radio bearer changes from an activated state to a deactivated state.

Optionally, the deactivation signaling indicates any one of the following:

that all transmission paths of the radio bearer are to be in the deactivated state;

that a first transmission path of the radio bearer is to be in the activated state while other transmission paths are to be in the deactivated state, where the other transmission paths are transmission paths other than the first transmission path in all the transmission paths of the radio bearer; or two transmission paths, where the two transmission paths are transmission paths of the radio bearer in the DC working mode after deactivation of the PDCP duplication function.

Optionally, the method further includes:

transmitting second configuration information to the terminal.

The second configuration information includes an initial state of the PDCP duplication function of the radio bearer, and the initial state is any one of the activated state or the deactivated state.

Optionally, the second configuration information further includes: configuration information with the initial state being an activated state, or configuration information with the initial state being a deactivated state.

The configuration information with the initial state being the activated state includes: identification information of a plurality of activated transmission paths.

The configuration information with the initial state being the deactivated state includes: identification information of at least one usable transmission path.

The foregoing embodiments describe the method for data transmission and the method for information configuration in this disclosure. The following describes the terminal and network device in this disclosure with reference to the embodiments and the figures.

Figure 7:
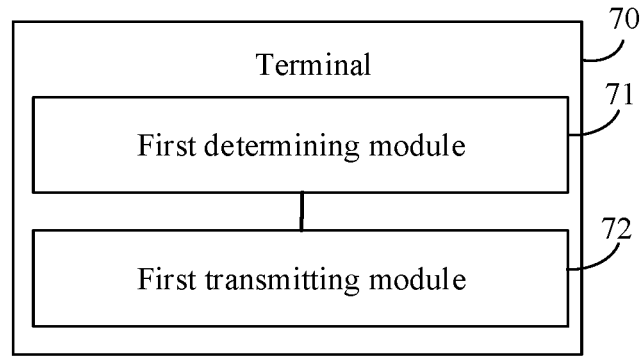
FIG. 7 is a first schematic structural diagram of a terminal according to some embodiments of this disclosure.

Referring to FIG. 7, FIG. 7 is a schematic structural diagram of a terminal according to some embodiments of this disclosure. As shown in FIG. 7, the terminal 70 includes:

a first determining module 71, configured to determine at least one transmission path usable for a radio bearer in a case that a packet data convergence protocol PDCP duplication function of the radio bearer changes from an activated state to a deactivated state; and a first transmitting module 72, configured to transmit PDCP data by using the at least one transmission path.

In a case that the PDCP duplication function is configured for a radio bearer of the terminal, and the PDCP duplication function changes from the activated state to deactivated state, the terminal in some embodiments of this disclosure may determine at least one transmission path usable for the radio bearer, and transmit PDCP data by using the at least one transmission path. In this way, it is clear about how to transmit data of a radio bearer when a PDCP duplication function of the radio bearer is deactivated, thereby ensuring that the network device side and the terminal side have the same understanding on a data reception and transmission mode of a corresponding radio bearer, and implementing more reliable data transmission.

Optionally, the first determining module 71 is specifically configured to:

determine the at least one transmission path usable for the radio bearer based on at least one of the following:

first configuration information; or deactivation signaling received from a network device; where the first configuration information is configuration information with the PDCP duplication function of the radio bearer deactivated, and the deactivation signaling is used to indicate changing the PDCP duplication function of the radio bearer from the activated state to the deactivated state.

Optionally, the first configuration information includes at least one of the following:

identification information of at least one usable transmission path; or using a DC working mode for the radio bearer after deactivation of the PDCP duplication function.

Optionally, in a case that the first configuration information includes using a DC working mode for the radio bearer after deactivation of the PDCP duplication function, the first configuration information further includes: configuration information of the DC working mode.

The configuration information of the DC working mode includes any one of the following:

identification information of two transmission paths used for the DC working mode;

identification information of a primary transmission path used for the DC working mode; or identification information of a secondary transmission path used for the DC working mode.

Optionally, the deactivation signaling indicates any one of the following:

that all transmission paths of the radio bearer are to be in the deactivated state;

that a first transmission path of the radio bearer is to be in the activated state while other transmission paths are to be in the deactivated state, where the other transmission paths are transmission paths other than the first transmission path in all the transmission paths of the radio bearer; or two transmission paths, where the two transmission paths are transmission paths of the radio bearer in the DC working mode after deactivation of the PDCP duplication function.

Optionally, the first determining module 71 is specifically configured to perform any one of the following:

in a case that the deactivation signaling indicates that all the transmission paths of the radio bearer are to be in the deactivated state, determining the at least one transmission path based on the identification information of the at least one usable transmission path included in the first configuration information;

in a case that the deactivation signaling indicates that the first transmission path of the radio bearer is to be in the activated state and other transmission paths are to be in the deactivated state, determining the first transmission path as the transmission path of the radio bearer;

in a case that the first configuration information includes the identification information of two transmission paths used for the DC working mode, determining the two transmission paths as the transmission paths of the radio bearer in the DC working mode;

in a case that the first configuration information includes the identification information of the primary transmission path for the DC working mode, determining the primary transmission path as a primary transmission path of the radio bearer in the DC working mode, and determining a transmission path to be in the activated state as indicated by the deactivation signalling as a secondary transmission path of the radio bearer in the DC working mode;

in a case that the first configuration information includes the identification information of the secondary transmission path for the DC working mode, determining the secondary transmission path as a secondary transmission path of the radio bearer in the DC working mode, and determining a transmission path to be in the activated state as indicated by the deactivation signalling as a primary transmission path of the radio bearer in the DC working mode; or determining the two transmission paths indicated by the deactivation signaling as the transmission paths of the radio bearer in the DC working mode, where the two transmission paths are transmission paths of the radio bearer in the DC working mode after deactivation of the PDCP duplication function.

Optionally, the terminal further includes:

a second determining module, configured to determine a transmission path of an MCG in the two transmission paths as a primary transmission path, and determine a transmission path of an SCG in the two transmission paths as a secondary transmission path; or determine a transmission path of an SCG in the two transmission paths as a primary transmission path, and determine a transmission path of an MCG in the two transmission paths as a secondary transmission path.

Optionally, the terminal further includes:

an obtaining module, configured to obtain second configuration information; and a third determining module, configured to determine an initial state of the PDCP duplication function of the radio bearer based on the second configuration information.

The second configuration information includes an initial state of the PDCP duplication function of the radio bearer, and the initial state is any one of the activated state or the deactivated state.

Optionally, the second configuration information further includes: configuration information with the initial state being an activated state, or configuration information with the initial state being a deactivated state.

The configuration information with the initial state being the activated state includes: identification information of a plurality of activated transmission paths.

The configuration information with the initial state being the deactivated state includes: identification information of at least one usable transmission path.

Optionally, the terminal further includes:

a fourth determining module, configured to determine, based on the second configuration information, a transmission path for transmitting the PDCP data.

Figure 8:
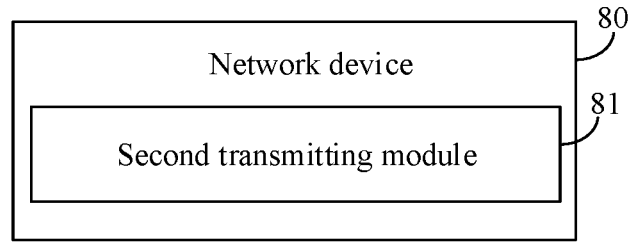
FIG. 8 is a first schematic structural diagram of a network device according to some embodiments of this disclosure.

Referring to FIG. 8, FIG. 8 is a schematic structural diagram of a network device according to some embodiments of this disclosure. As shown in FIG. 8, the network device 80 includes:

a second transmitting module 81, configured to transmit first configuration information to a terminal.

The first configuration information is configuration information with a PDCP duplication function of a radio bearer deactivated.

In some embodiments of this disclosure, the first configuration information is transmitted to the terminal, so that the terminal may be clear about how to transmit data of a radio bearer when a PDCP duplication function of the radio bearer is deactivated, thereby ensuring that the network device side and the terminal side have the same understanding on a data reception and transmission mode of a corresponding radio bearer, and implementing more reliable data transmission.

Optionally, the first configuration information includes at least one of the following:

identification information of at least one usable transmission path; or using a DC working mode for the radio bearer after deactivation of the PDCP duplication function.

Optionally, in a case that the first configuration information includes using a DC working mode for the radio bearer after deactivation of the PDCP duplication function, the first configuration information further includes: configuration information of the DC working mode.

The configuration information of the DC working mode includes any one of the following:

identification information of two transmission paths used for the DC working mode;

identification information of a primary transmission path used for the DC working mode; or identification information of a secondary transmission path used for the DC working mode.

Optionally, the network device further includes:

a third transmitting module, configured to transmit deactivation signaling to the terminal.

The deactivation signaling is used to indicate that the packet data convergence protocol PDCP duplication function of the radio bearer changes from an activated state to a deactivated state.

Optionally, the deactivation signaling indicates any one of the following:

that all transmission paths of the radio bearer are to be in the deactivated state;

that a first transmission path of the radio bearer is in the activated state while other transmission paths are to be in the deactivated state, where the other transmission paths are transmission paths other than the first transmission path in all the transmission paths of the radio bearer; or two transmission paths, where the two transmission paths are transmission paths of the radio bearer in the DC working mode after deactivation of the PDCP duplication function.

Optionally, the network device further includes:

a fourth transmitting module, configured to transmit second configuration information to the terminal.

The second configuration information includes an initial state of the PDCP duplication function of the radio bearer, and the initial state is any one of the activated state or the deactivated state.

Optionally, the second configuration information further includes: configuration information with the initial state being an activated state, or configuration information with the initial state being a deactivated state.

The configuration information with the initial state being the activated state includes: identification information of a plurality of activated transmission paths.

The configuration information with the initial state being the deactivated state includes: identification information of at least one usable transmission path.

Some embodiments of this disclosure further provide a communications device, including a processor, a memory, and a program stored in the memory and capable of running on the processor. When the program is executed by the processor, the processes of the embodiment of the method for data transmission applied to the terminal are implemented, or the processes of the embodiment of the method for information configuration applied to the network device are implemented, with the same technical effects achieved. To avoid repetition, details are not described herein again. Optionally, the communications device is optionally a terminal or network device.

Figure 9:
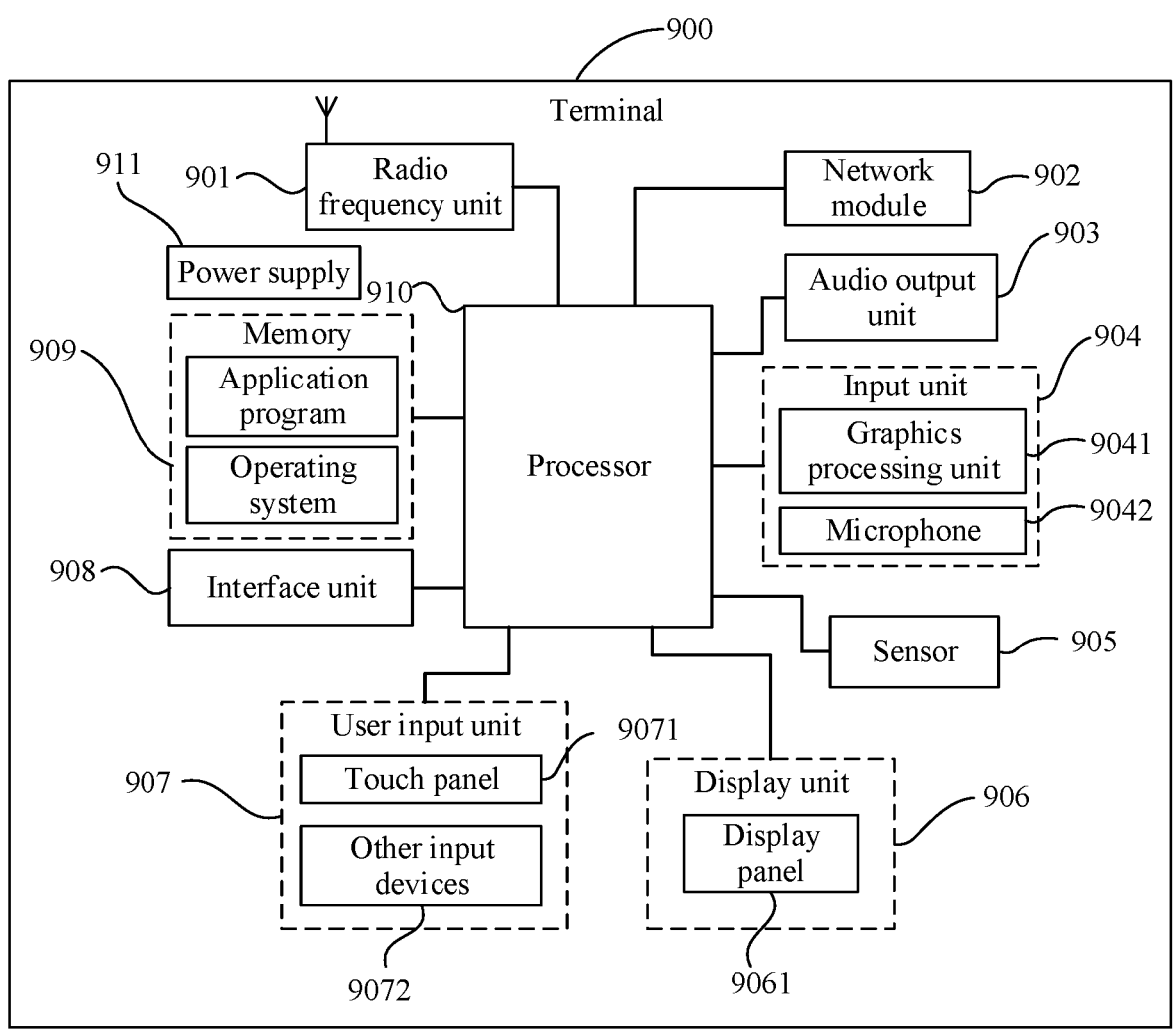
FIG. 9 is a second schematic structural diagram of a terminal according to some embodiments of this disclosure.

Specifically, FIG. 9 is a schematic structural diagram of hardware of a terminal for implementing the embodiments of this disclosure. The terminal 900 includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the structure of the terminal shown in FIG. 9 does not constitute any limitation on the terminal. The terminal may include more or fewer components than those shown in the figure, or a combination of some components, or the components disposed differently. In some embodiments of this disclosure, the terminal includes but is not limited to a mobile phone, a tablet computer, a laptop computer, a palmtop computer, an in-vehicle terminal, a wearable device, a pedometer, and the like.

The processor 910 is configured to determine at least one transmission path usable for a radio bearer in a case that a packet data convergence protocol PDCP duplication function of the radio bearer changes from an activated state to a deactivated state.

The radio frequency unit 901 is configured to transmit PDCP data by using the at least one transmission path.

Further, the processor 910 is configured to determine the at least one transmission path usable for the radio bearer based on at least one of the following:

first configuration information; or deactivation signaling received from a network device.

The first configuration information is configuration information with the PDCP duplication function of the radio bearer deactivated, and the deactivation signaling is used to indicate changing the PDCP duplication function of the radio bearer from the activated state to the deactivated state.

Figure 5:
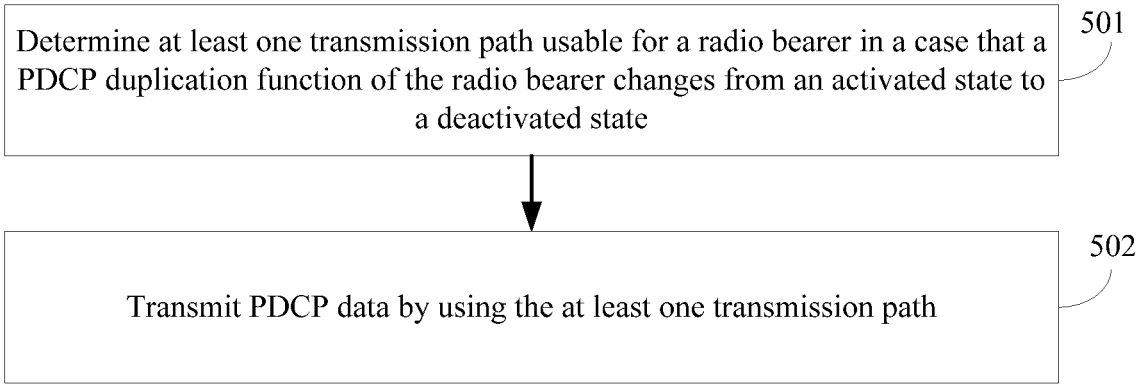
FIG. 5 is a flowchart of a method for data transmission according to some embodiments of the disclosure.

It can be understood that the terminal 900 in some embodiments of this embodiment is capable of implementing the processes implemented in the method embodiment shown in FIG. 5, with the same beneficial effects achieved. To avoid repetition, details are not described herein again.

It should be understood that in some embodiments of this disclosure, the radio frequency unit 901 may be configured to: receive and send signals in an information receiving/sending process or a call process; and specifically, after receiving downlink data from a base station, send the downlink data to the processor 910 for processing, and in addition, send uplink data to the base station. Generally, the radio frequency unit 901 includes but is not limited to an antenna, at least one amplifier, a transceiver, a coupler, a low noise amplifier, a duplexer, and the like. In addition, the radio frequency unit 901 may also communicate with a network and other devices via a wireless communications system.

The terminal provides a user with wireless broadband internet access through the network module 902, for example, helping the user to transmit and receive e-mails, browse web pages, and access streaming media.

The audio output unit 903 may convert audio data received by the radio frequency unit 901 or the network module 902 or stored in the memory 909 into an audio signal and output the audio signal as a sound. Furthermore, the audio output unit 903 may also provide audio output (for example, a call signal received sound or a message received sound) related to a specific function performed by the terminal 900. The audio output unit 903 includes a speaker, a buzzer, a receiver, and the like.

The input unit 904 is configured to receive an audio or video signal. The input unit 904 may include a graphics processing unit (GPU) 9041 and a microphone 9042. The graphics processing unit 9041 processes image data of a still picture or video obtained by an image capture apparatus (such as a camera) in a video capture mode or an image capture mode. A processed image frame may be displayed on the display unit 906. The image frame processed by the graphics processing unit 9041 may be stored in the memory 909 (or another storage medium) or be transmitted by the radio frequency unit 901 or the network module 902. The microphone 9042 is capable of receiving sounds and processing such sounds into audio data. The processed audio data may be converted in a telephone call mode into a format that can be transmitted by the radio frequency unit 901 to a mobile communications base station, for outputting.

The terminal 900 may further include at least one sensor 905, for example, an optical sensor, a motion sensor, and another sensor. Specifically, the optical sensor may include an ambient light sensor and a proximity sensor. The ambient light sensor may adjust luminance of the display panel 9061 based on brightness of ambient light, and the proximity sensor may turn off the display panel 9061 and/or backlight when the terminal 900 moves close to an ear. As a type of motion sensor, an accelerometer sensor can detect magnitudes of accelerations in various directions (typically three axes), can detect the magnitude and direction of gravity when the mobile phone is in a static state, and can be applied to terminal posture recognition (such as screen switching between portrait and landscape, related games, and magnetometer posture calibration), functions related to vibration recognition (such as pedometer and tapping), and the like. The sensor 905 may also include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information input by the user or information provided to the user. The display unit 906 may include a display panel 9061, and the display panel 9061 may be configured in a form of a liquid crystal display (LCD), an organic light-emitting diode (OLED), or the like.

The user input unit 907 may be configured to receive input digit or character information and generate key signal input related to user setting and function control of the mobile terminal. Specifically, the user input unit 907 may include a touch panel 9071 and other input devices 9072. The touch panel 9071 is also referred to as a touchscreen and can collect a touch operation (such as an operation performed by the user on the touch panel 9071 or near the touch panel 9071 with a finger or by using any proper object or accessory such as a stylus) of the user on or near the touch panel 9071. The touch panel 9071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 910, and can receive a command transmitted by the processor 910 and execute the command. In addition, the touch panel 9071 may be implemented in a plurality of forms, for example, as a resistive, capacitive, infrared, or surface acoustic wave touch panel. In addition to the touch panel 9071, the user input unit 907 may further include other input devices 9072. Specifically, the other input devices 9072 may include but are not limited to a physical keyboard, a function key (such as a volume control key or an on/off key), a trackball, a mouse, and a joystick. Details are not described herein.

Further, the touch panel 9071 may cover the display panel 9061. When detecting a touch operation on or near the touch panel 9071, the touch panel 9071 transmits the touch operation to the processor 910 to determine a type of a touch event. Then, the processor 910 provides a corresponding visual output on the display panel 9061 based on the type of the touch event. Although in FIG. 9, the touch panel 9071 and the display panel 9061 act as two independent parts to implement input and output functions of the terminal, in some embodiments, the touch panel 9071 and the display panel 9061 may be integrated to implement the input and output functions of the terminal. This is not specifically limited herein.

The interface unit 908 is an interface between an external apparatus and the terminal 900. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 908 may be configured to: receive input (for example, data information and power) from the external apparatus, and transmit the received input to one or more elements in the terminal 900, or may be configured to transmit data between the terminal 900 and the external apparatus.

The memory 909 may be configured to store software programs and various data. The memory 909 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 909 may include a high-speed random access memory, and may further include a non-volatile memory such as at least one disk storage device, a flash memory device, or another volatile solid-state storage device.

The processor 910 is a control center of the terminal, and is connected to the components of the terminal by using various interfaces and lines. By running or executing software programs and/or modules stored in the memory 909 and calling data stored in the memory 909, the processor 910 executes various functions of the terminal and processes data, so as to perform overall monitoring on the terminal. The processor 910 may include one or more processing units. Optionally, an application processor and a modem processor may be integrated in the processor 910. The application processor primarily processes an operating system, user interfaces, application programs, and the like. The modem processor primarily processes radio communication. It can be understood that the modem processor may alternatively be not integrated in the processor 910.

The terminal 900 may further include the power supply 911 (for example, a battery) supplying power to all components. Optionally, the power supply 911 may be logically connected to the processor 910 through a power management system. In this way, functions such as charge management, discharge management, and power consumption management are implemented by using the power management system.

In addition, the terminal 900 may further include some functional modules that are not shown. Details are not described herein.

Figure 10:
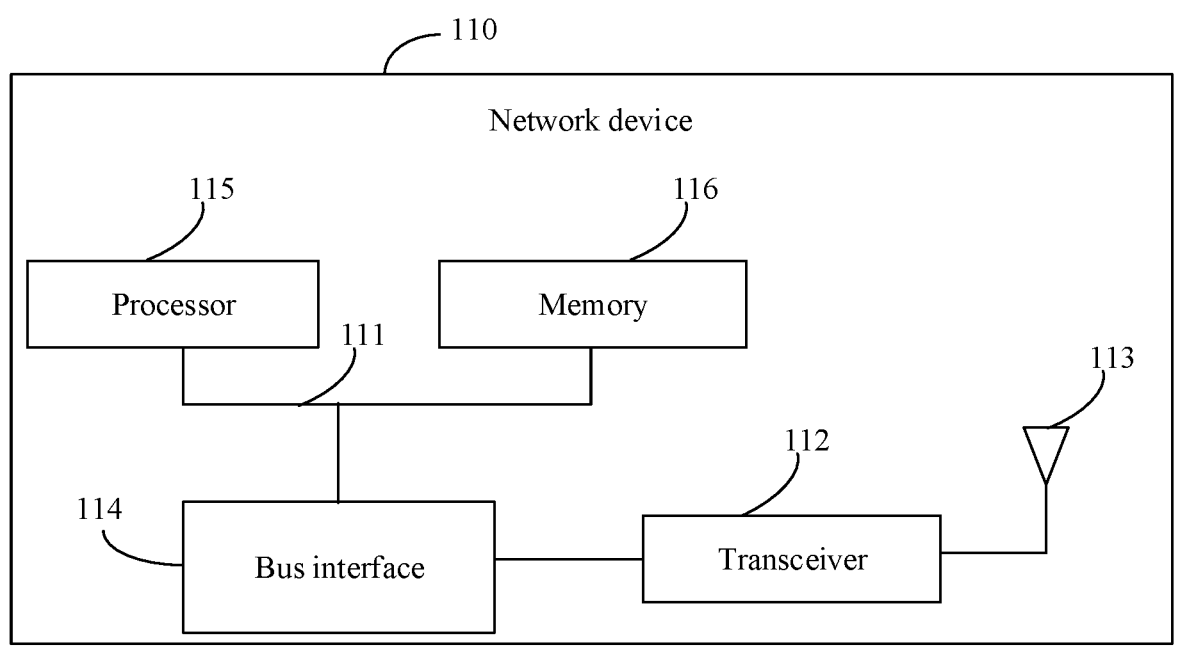
FIG. 10 is a second schematic structural diagram of a network device according to some embodiments of this disclosure.

Specifically, FIG. 10 is a schematic structural diagram of hardware of a network device for implementing the embodiments of this disclosure. The network device 110 includes a bus 111, a transceiver 112, an antenna 113, a bus interface 114, a processor 115, and a memory 116.

In some embodiments of this disclosure, the network device 110 further includes a program stored in the memory 116 and capable of running on the processor 115. When the program is executed by the processor 115, the processes implemented in the method embodiment shown in FIG. 6 are implemented, with the same beneficial effects achieved. To avoid repetition, details are not described herein again.

The transceiver 112 is configured to receive and transmit data under the control of processor 115.

In some embodiments of this embodiment, the network device 110 is capable of implementing the processes implemented in the method embodiment shown in the foregoing figure, with the same beneficial effects achieved. To avoid repetition, details are not described herein again.

In FIG. 10, a bus architecture (represented by a bus 111), that is, the bus 111, may include any quantity of interconnected buses and bridges. The bus 111 connects one or more processors represented by the processor 115 to each circuit of a memory represented by a memory 116. The bus 111 may further connect a peripheral device and a voltage stabilizer to other circuits such as a power management circuit. This is known in the prior art, and the specification does not provide a further description. The bus interface 114 provides an interface between the bus 111 and the transceiver 112. The transceiver 112 may be one component or a plurality of components, for example, a plurality of transmitters and receivers, and provides units for communicating with a variety of other apparatuses on a transmission medium. Data processed by the processor 115 is transmitted over a wireless medium through the antenna 113. Further, the antenna 113 also receives data and transmits the data to the processor 115.

The processor 115 is responsible for managing the bus 111 and general processing, and provides various functions, including timing, peripheral interfaces, voltage regulation, power management, and other control functions. The memory 116 may be configured to store data that is used when the processor 115 performs an operation.

Optionally, the processor 115 may be CPU, ASIC, FPGA, or CPLD.

Some embodiments of this disclosure further provide a computer-readable storage medium, where a computer program is stored in the computer-readable storage medium. When the computer program is executed by a processor, the processes in the foregoing embodiment of the method for data transmission applied to the terminal or the processes in the foregoing embodiment of the method for information configuration applied to the network device are implemented, with the same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the prior art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

It may be understood that the embodiments described in this disclosure may be implemented by hardware, software, firmware, middleware, microcode, or a combination thereof. For hardware implementation, a module, a unit, a submodule, a subunit, and the like may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

Therefore, the objectives of this disclosure can also be implemented by running a program or a set of programs on any computing apparatus. The computing apparatus may be a well-known general-purpose apparatus. Therefore, the objectives of this disclosure may also be implemented only by a program product that contains program code for implementing the method or apparatus. That is, such program product also constitutes this disclosure, and a storage medium storing such program product also constitutes this disclosure. Obviously, the storage medium may be any known storage medium or any storage medium developed in the future. It should be also noted that, in the apparatus and method of this disclosure, obviously, the components or steps can be decomposed and/or recombined. Such decomposition and/or recombination should be considered as an equivalent solution of this disclosure. Further, the steps of performing the afore-mentioned series of processing may be naturally performed in an order of the description or in a time order, but is not necessarily performed in a time order. Some steps may be performed in parallel or independently of each other.

The foregoing describes the embodiments of this disclosure with reference to the accompanying drawings. However, this disclosure is not limited to the foregoing specific implementation manners. The foregoing specific implementation manners are merely illustrative rather than restrictive.

As instructed by this disclosure, persons of ordinary skill in the art may develop many other manners without departing from principles of this disclosure and the protection scope of the claims, and all such manners fall within the protection scope of this disclosure.

What is claimed is:

1. A method for data transmission, applied to a terminal and comprising:
 determining two transmission paths usable for a radio bearer in a case that a packet data convergence protocol (PDCP) duplication function of the radio bearer changes from an activated state to a deactivated state; and
 transmitting PDCP data by using the two transmission paths;
 wherein the determining two transmission paths usable for a radio bearer comprises:
 determining the two transmission paths usable for the radio bearer based on first configuration information;
 wherein the first configuration information comprises configuration information of a dual connectivity (DC) working mode that is used for the radio bearer after deactivation of the PDCP duplication function;
 wherein the configuration information of the DC working mode comprises:
 identification information of a primary transmission path used for the DC working mode; and
 identification information of a secondary transmission path used for the DC working mode;
 wherein the determining two transmission paths usable for a radio bearer comprises:
 determining a transmission path corresponding to the identification information of the primary transmission path used for the DC working mode and a transmission path corresponding to the identification information of the secondary transmission path used for the DC working mode as the two transmission paths.

2. The method according to claim 1, wherein the determining two transmission paths usable for a radio bearer further comprises:
 determining the two transmission paths usable for the radio bearer based on deactivation signaling received from a network device; wherein
 the first configuration information is configuration information with the PDCP duplication function of the radio bearer deactivated, and the deactivation signaling is used to indicate changing the PDCP duplication function of the radio bearer from the activated state to the deactivated state.

3. The method according to claim 2, wherein the deactivation signaling indicates any one of the following:
 that all transmission paths of the radio bearer are to be in the deactivated state;
 that a first transmission path of the radio bearer is to be in the activated state while other transmission paths are to be in the deactivated state, wherein the other transmission paths are transmission paths other than the first transmission path in all the transmission paths of the radio bearer; or
 two transmission paths, wherein the two transmission paths are transmission paths of the radio bearer in the DC working mode after deactivation of the PDCP duplication function.

4. The method according to claim 1, wherein before the determining two transmission paths usable for a radio bearer in a case that a packet data convergence protocol PDCP duplication function of the radio bearer changes from an activated state to a deactivated state, the method further comprises:
 obtaining second configuration information; and
 determining an initial state of the PDCP duplication function of the radio bearer based on the second configuration information; wherein
 the second configuration information comprises the initial state of the PDCP duplication function of the radio bearer, and the initial state is any one of the activated state or the deactivated state.

5. The method according to claim 4, wherein
 the second configuration information further comprises:
 configuration information with the initial state being an activated state, or configuration information with the initial state being a deactivated state; and
 the configuration information with the initial state being an activated state comprises identification information of a plurality of activated transmission paths; and the configuration information with the initial state being a deactivated state comprises identification information of at least one usable transmission path.

6. The method according to claim 5, further comprising:
 determining, based on the second configuration information, a transmission path for transmitting the PDCP data.

7. The method according to claim 1, wherein the primary transmission path is a transmission path of a master cell group MCG, and the secondary transmission path is a transmission path of a secondary cell group SCG.

8. A method for information configuration, applied to a network device and comprising:
 transmitting first configuration information to a terminal;
 wherein the first configuration information comprises configuration information of a dual connectivity (DC) working mode that is used for a radio bearer after deactivation of a packet data convergence protocol (PDCP) duplication function;
 wherein the configuration information of the DC working mode comprises:
 identification information of a primary transmission path used for the DC working mode; and
 identification information of a secondary transmission path used for the DC working mode;
 receiving PDCP data transmitted by the terminal using two transmission paths; wherein a transmission path corresponding to the identification information of the primary transmission path used for the DC working mode and a transmission path corresponding to the identification information of the secondary transmission path used for the DC working mode are determined as the two transmission paths.

9. The method according to claim 8, wherein after the transmitting first configuration information to a terminal, the method further comprises:
 transmitting deactivation signaling to the terminal, wherein
 the deactivation signaling is used to indicate that the packet data convergence protocol PDCP duplication function of the radio bearer changes from an activated state to a deactivated state.

10. The method according to claim 9, wherein the deactivation signaling indicates any one of the following:
 that all transmission paths of the radio bearer are to be in the deactivated state;
 that a first transmission path of the radio bearer is to be in the activated state while other transmission paths are to be in the deactivated state, wherein the other transmission paths are transmission paths other than the first transmission path in all the transmission paths of the radio bearer; or two transmission paths, wherein the two transmission paths are transmission paths of the radio bearer in the DC working mode after deactivation of the PDCP duplication function.

11. The method according to claim 8, further comprising:
transmitting second configuration information to the terminal; wherein the second configuration information comprises an initial state of the PDCP duplication function of the radio bearer, and the initial state is any one of the activated state and the deactivated state.

12. The method according to claim 11, wherein
the second configuration information further comprises:
configuration information with the initial state being an activated state, or configuration information with the initial state being a deactivated state; and the configuration information with the initial state being an activated state comprises identification information of a plurality of activated transmission paths; and the configuration information with the initial state being a deactivated state comprises identification information of at least one usable transmission path.

13. A terminal, comprising a memory, a processor, and a program stored in the memory and capable of running on the processor, wherein the program is executed by the processor to implement:

determining two transmission paths usable for a radio bearer in a case that a packet data convergence protocol (PDCP) duplication function of the radio bearer changes from an activated state to a deactivated state; and transmitting PDCP data by using the two transmission paths;

wherein the determining two transmission paths usable for a radio bearer comprises:
determining the two transmission paths usable for the radio bearer based on first configuration information;
wherein the first configuration information comprises configuration information of a dual connectivity (DC) working mode that is used for the radio bearer after deactivation of the PDCP duplication function;
wherein the configuration information of the DC working mode comprises:
identification information of a primary transmission path used for the DC working mode; and
identification information of a secondary transmission path used for the DC working mode;
wherein the determining two transmission paths usable for a radio bearer comprises:
determining a transmission path corresponding to the identification information of the primary transmission path used for the DC working mode and a transmission path corresponding to the identification information of the secondary transmission path used for the DC working mode as the two transmission paths.

14. The terminal according to claim 13, wherein the primary transmission path is a transmission path of a master cell group MCG, and the secondary transmission path is a transmission path of a secondary cell group SCG.

15. A network device, comprising a memory, a processor, and a program stored in the memory and capable of running on the processor, wherein when the program is executed by the processor, the steps of the method for information configuration according to claim 8 are implemented.

16. A non-transitory computer-readable storage medium, wherein a computer program is stored in the non-transitory computer-readable storage medium, and when the computer program is executed by a processor, the steps of the method for data transmission according to claim 1 are implemented.

* * * * *